Figure 1:
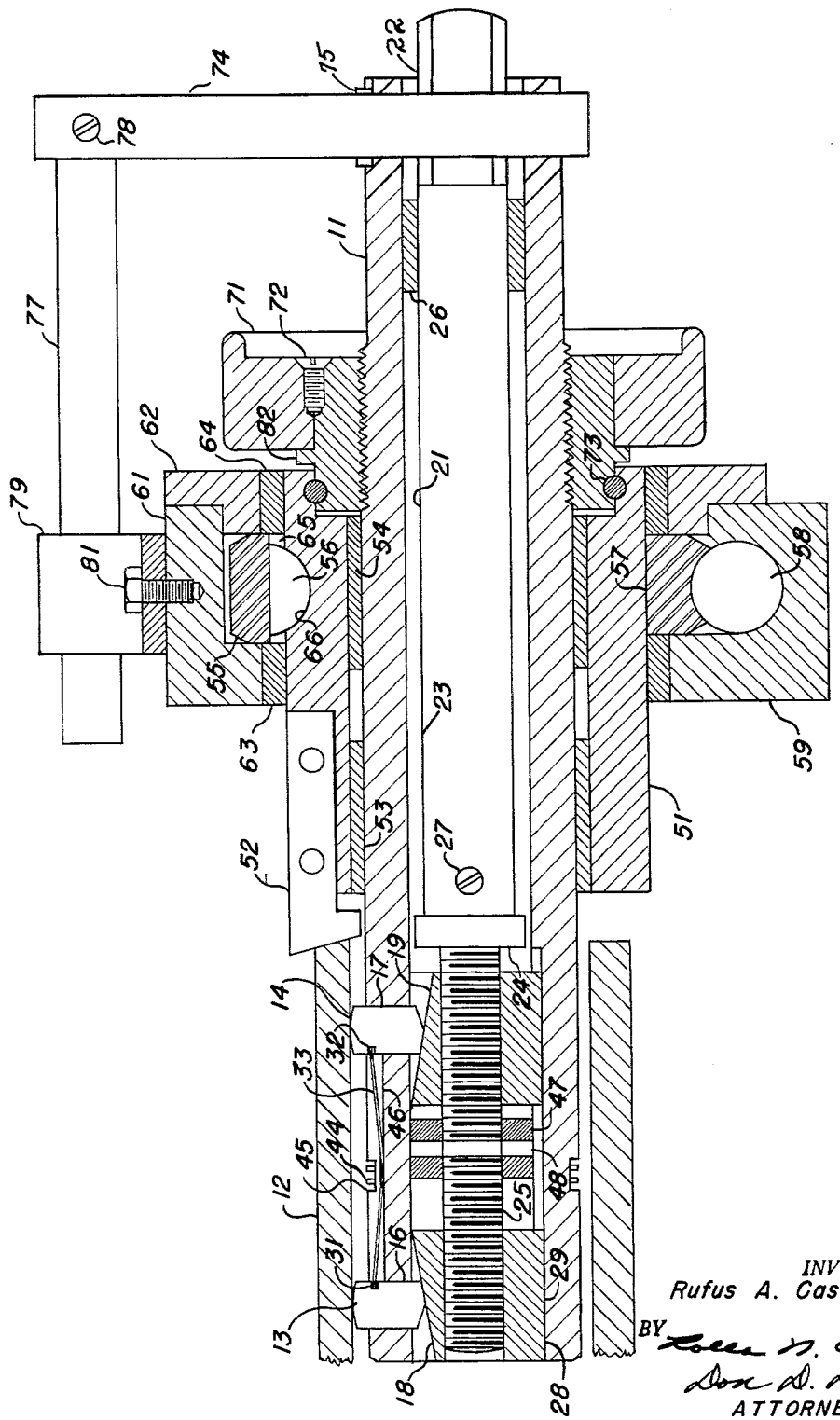

INVENTOR.
RUFUS A. CASTLES, JR.

3,229,555
PIPE-END FINISHING MACHINE
Rufus A. Castles, Jr., 1443 Cecelia Drive, Live Oak
Terrace, Charleston, S.C.
Filed Jan. 17, 1964, Ser. No. 338,534
8 Claims. (Cl. 82—4)
(Granted under Title 35, U.S. Code (1952), sec. 266)

The invention described herein may be manufactured and used by or for the Government of the United States of America for governmental purposes without the payment of any royalties thereon or therefor.

The present invention relates generally to pipe-working machinery and in particular is a machine for accurately finishing the ends of pipe in praperation for welding joints thereof.

In the past, it has been exceedingly difficult to produce outside bevels and end-flat lands which were true with respect to the bore of a pipe being machine finished. Primarily this was due to the finishing machine being clamped and centered on the outside of the pipe by means of collets. Moreover, the cutting head and tool bits were usually enclosed by a housing which, in turn, made adjustment and installation of the cutter bits exceedingly difficult, and, even more important, centering on the outside of the pipe would not necessarily result in a bevel and flat land that would be centered and true with respect to the inside diameter of the pipe, a critical parameter in pipe joint welding.

The present invention overcomes most of the foregoing disadvantages because the machining operation is referenced to the critical bore parameter of the pipe and, therefore, is true with respect thereto, even though the outside diameter may vary considerably.

It is, thus, an object of this invention to provide an improved pipe end finishing machine.

Another object of this invention is to provide a pipe finishing machine that performs its finishing operations while being position controlled by the pipe bore.

Still another object of this invention is to provide a method and means for cutting a bevel and end flat on a pipe which is true and concentric with respect to the longitudinal axis thereof, as well as the inside diameter thereof.

Another object of this invention is to provide a pipe finishing machine which facilitates varying types of cutting configurations being applied to any predetermined pipe.

Another object of this invention is to provide an improved method and means for preparing pipe joints for welding.

Another object of this invention is to provide an improved method and means for accurately aligning the bores of pipes being joined together, so that flow therebetween will be substantially smooth, laminar, and unimpeded.

A further objective of this invention is to provide a pipe finishing machine that is portable and easily and safely operated.

Another object of this invention is to provide a pipe finishing machine that is easily and economically manufactured and maintained.

Figure 2:
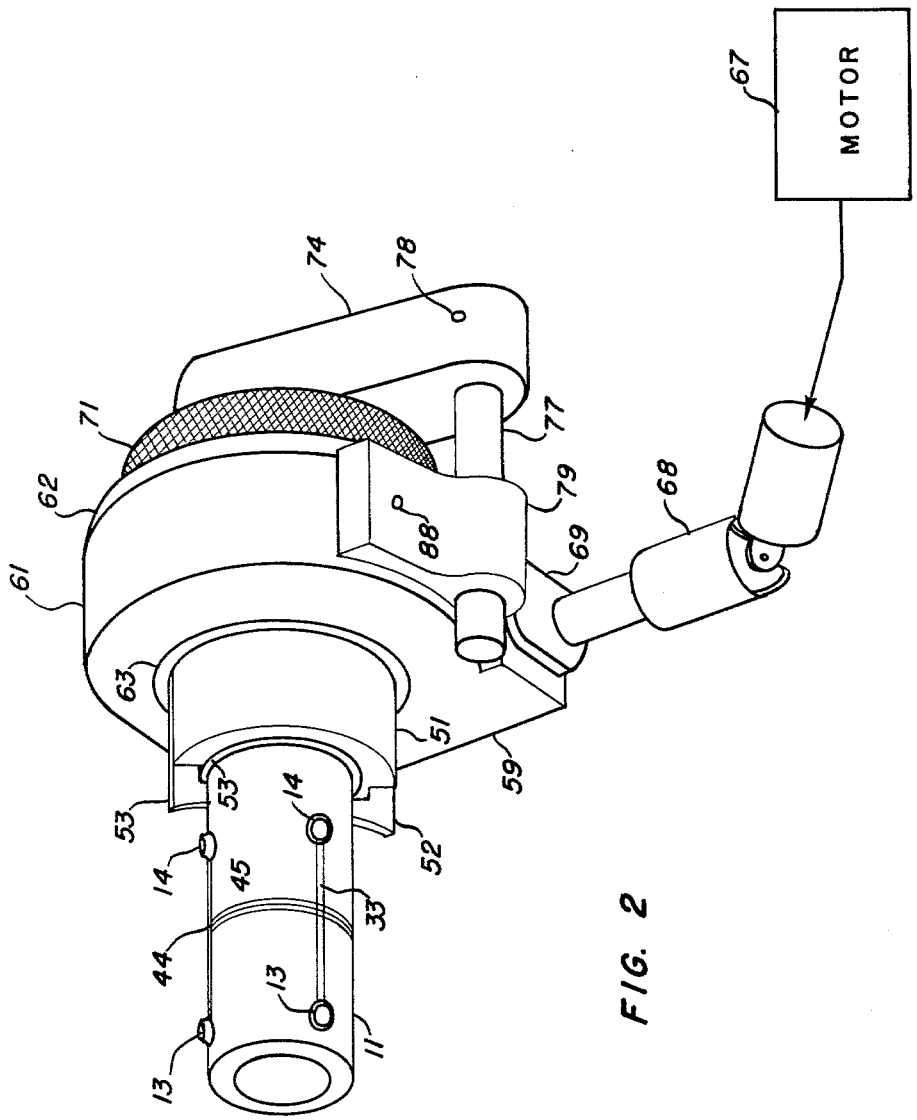

Other objects and many of the attendant advantages will be readily appreciated as the subject invention becomes better understood by reference to the following detailed description when considered in conjunction with the accompanying drawing wherein like reference characters designate like parts and wherein:

FIG. 1 is an elevational view, partly in cross-section, of the pipe finishing machine constituting this invention; and FIG. 2 is representative pictorial and diagrammatical view of the subject invention.

Referring now to FIGS. 1 and 2, the machine constituting this invention is shown as having a center mandrel 11 that is centered in and secured to the inside of a pipe 12 by a plurality of tapered pins 13 and 14 located for slidable movement within apertures 16 and 17 extending through the wall of mandrel 11. Although only one operable pair of pins 13 and 14 are shown in FIG. 1, as a result of its being illustrated in cross-section for the most part, actually three pairs thereof are spaced 120° around the diameter of the mandrel in such manner that mandrel 11 is centered within pipe 12 when said pins are urged to the maximum radial position allowed by the inside diameter of the pipe. The urging thereof in such manner is effected by a like plurality of ramped slides 18 and 19 which abut the inner surface thereof.

A shaft 21 consisting of a hexagonal end 22, a center portion 23, a centering flange 24, and a threaded stud 25 are disposed within the hollow of center mandrel 11. A bronze bearing 26 holds shaft 21 within mandrel 11 in such manner that it may be rotated easily and still be securely positioned therein.

Stud 25 has threads at each end thereof that are oppositely cut and slides 18 and 19 have complementary threaded holes which enable them to be screwed on the ends of stud 25, respectively, and be moved therealong in opposite longitudinal directions when shaft 21 is rotated. Stud 25 is also screwed into a threaded hole located in the flanged end of shaft 21 and secured therein by a set screw 27 or the like.

The aforementioned slides 18 and 19 may be substantially cylindrical in shape, with the flat slide or ramp portions thereon adapted for mating with the tapered end surfaces of pins 13 and 14, respectively, in such manner that they will not rotate with shaft 21 but, rather, will move along the longitudinal axis thereof. Or, on the other hand, said slides may each include a tongue 28 which rides in a groove 29 longitudinally located in complementary manner in mandrel 11, so as to act as a sliding key arrangement to prevent the rotation of slides 18 and 19 with stud 25 as it is being turned for adjustment purposes, or will be further explained subsequently.

Pins 13 and 14 each contain slots 31 and 32 for attaching a keeper wire 33 thereto. Spring clamps 44, which, for instance, may be of the split type, are located in radial groove 45 in mandrel 11 to urge resilient keeper wire 33 toward the bottom of longitudinal groove 46. This, in turn, urges pins 13 and 14 toward a recessed position within apertures 16 and 17 and in slidable contact with the ramp portions of slides 18 and 19.

At approximately the unthreaded center of stud 25, another bearing 47 is mounted thereon by means of a pin or screw 48. This bearing not only rides within mandrel 11 to reduce friction, it acts as a rotatable centering means for the stud end of shaft 21 and as a center stop for slides 18 and 19.

A tool head 51 carries a pair of tool bits 52 and 53, one of which is formed and ground as necessary to cut the flat land and the other of which is formed and ground to cut the desired bevel on the end of the pipe being finished. Bronze bearings 53 and 54 are interposed between tool head 51 and mandrel 11 to allow relative rotation therebetween with a minimum of friction. Tool head 51 is connected to a worm gear 55 through a key 56 which causes it to turn therewith. Worm gear 55, of course, rides on and turns with tool head 51 because a portion of the outside surface thereof acts as a bearing support 57 therefor. A worm 58 drives worm gear 55 to effect rotation thereof. A housing 59 for worm gear 55 and worm 58 is composed of separable sections 61 and 62 in order to facilitate assembly, disassembly, and maintenance of the subject machine. This, of course, also facilitates insertion of semi-circular shaped key 56 into a slot 65 transversely extending across the inner surface of worm gear 55 and a complementary slot 66 located in a tool head 51 so as to effect rotation thereof as a unitary assembly. Sections 61 and 62 may be joined in any conventional and suitable manner, such as by press fit, screws, bolts, or the like.

Housing 59, when assembled, rides on bearings 63 and 64 attached to the periphery of tool head 51 in order to effect relative rotation therebetween with a minimum of friction, thereby requiring less power to operate, as well as providing longer life. Any appropriate power source, such as a motor 67, may be used to drive worm 59, and any power train such as shaft and universal joint 68, supported by any suitable packing gland 69, may be employed to make the subject device as portable as necessary to do the job.

Tool head 51 is forced to slide on bearings 53 and 54 toward or away from the end of pipe 12 by a knurled ball bearing feed adjustment nut 71. A threaded section thereof, attached to the knurled section by means of screws 72 or the like, screws on the complementary threaded portion of mandrel 11 to effect such sliding operation when the knurled portion thereof is rotated by a human operator. To reduce the rotational drag of feed nut 71, ball bearings 73 are inserted in complementary races located in tool head 51 and the threaded section of nut 71.

The worm and gear housing 59 is prevented from rotating by means of a reaction arm 74 secured to mandrel 11 by a key 75. A reaction bar 77 is securely mounted in a hole in the end of arm 74 by a set screw 78 or other conventional connecting means, and it also extends over to housing 59 where it is longitudinally slidably but otherwise secured thereto by a bracket 79 which, in turn, is mounted on said housing by one or more bolts 81.

Briefly, the operation of the subject invention is as follows:

The pipe to be finished is placed over the end of mandrel 11 in such manner that it may be securely held and cantered thereon by pins 13 and 14. This may be effected by turning shaft 21 with any suitable wrench applied to the hex end 22 thereof. This, in turn, causes slides 18 and 19 to move away from each other and force pins 13 and 14 toward the inner surface of the pipe, effecting the centering of mandrel 11 therein. In some instances, the contact between the respective slide ramps and pins will prevent their being turned as shaft 21 is turned; however, as previously mentioned, where such contact force is insufficient to prevent slides 18 and 19 from turning, the tongue 28 and groove 29 arrangement, or any other conventional rotational stop arrangement, may be resorted to without violating the spirit and scope of this invention, inasmuch as so doing would be well within the purview of one skilled in the art having the benefit of the teachings herein presented.

Obviously, the type of finish cuts to be applied to the end of the pipe are determined by the forms or cutting edges of tool bits 52 and 53 and are, thus, a matter of design choice. With arm 74 installed as shown in FIGS. 1 and 2, and with worm 58 connected to a suitable power supply 67, said tool bits are rotated in a cutting position around mandrel 11. To actually make the finishing cut, the tool bits are effectively forced into the end of the pipe as a result of hand-turning knurled adjustment nut 71, causing it to be moved on its threaded portion toward said pipe. Thus, movement of nut 71 along mandrel 11 causes tool head 51 and tool bits 52 and 53 to be moved due to ball bearings and a flange 82 applying axial force thereto. This axial force in combination with the aforementioned forced rotary motion of the tool bits causes the end of the pipe to be very accurately finished or cut with respect to the bore thereof. Of course, when two or more of such finished pipes are properly joined together (as by welding) their bores are very accurately mated, thereby facilitating the optimum flow of fluids therethrough.

Obviously, many modifications and other embodiments of the subject invention will readily come to the mind of one skilled in the art having the benefit of the teachings presented in the foregoing description in accompaniment with the associated drawing. Therefore, it is to be understood that the invention is not to be limited thereto and that said modification and embodiments are intended to be included within the scope of the appended claims.

What is claimed is:

1. A pipe-end finishing machine comprising in combination,
   a mandrel having an axis of revolution,
   a plurality of apertures disposed radially and longitudinally substantially adjacent one end of said mandrel,
   an externally threaded portion disposed adjacent the other end of said mandrel,
   a like plurality of pins respectively disposed for radial slidable movement within the apertures of said mandrel,
   resilient means connected between each of said pins and said mandrel for urging said pins toward a recessed position,
   a shaft rotatably mounted within said mandrel having a hexagonal portion at one end thereof,
   a stud having oppositely threaded ends with one end thereof connected to the other end of said shaft for rotation therewith,
   a pair of ramped slides respectively mounted on the oppositely threaded ends of said stud for threaded engagement therewith and in slidable contact with the aforesaid pins for adjustably urging same in an outward radial direction in opposition with said resilient pin urging means,
   a tool head rotatably and slidably mounted on said mandrel,
   at least one tool bit attached to one end of said tool head,
   a worm gear mounted on and surrounding said tool head,
   key means interconnecting said worm gear and said tool head,
   a worm disposed in driving engagement with said worm gear,
   a housing rotatably mounted on said tool head,
   an adjustment nut means connected to said tool head and in threaded engagement with the threaded portion of said mandrel for moving said tool head along a portion of the length of said mandrel when turned on said threaded portion, and
   means interconnecting said housing and the aforesaid mandrel for the holding thereof in predetermined fixed relative positions.

2. The invention according to claim 1 further characterized by a bearing means interposed between the inside surface of said mandrel and the outside surface of the aforesaid shaft.

3. The invention according to claim 2 further characterized by another bearing means interposed between said mandrel and the aforesaid tool head.

4. The invention according to claim 3 further charactreized by a ball bearing means interposed between said adjustment nut means and the aforesaid tool head.

5. The invention according to claim 4 further characterized by a flange attached to said adjustment nut means adapted for abutment with the end of said tool head when said adjustment nut means is turned to effect movement of said tool head toward the pin mounted end of the aforesaid mandrel.

6. The invention according to claim 5 further characterized by still another bearing means interposed between said housing and said tool head.

7. The invention according to claim 6 further characterized by a drive motor connected to the aforesaid worm.

8. A pipe-end finishing machine consisting of:
a mandrel having an axis of revolution,
a plurality of apertures disposed radially and longitudinally adjacent one end of said mandrel,
a plurality of longitudinally grooves respectively disposed in the periphery of said mandrel between longitudinal pairs of said apertures,
an externally threaded portion disposed adjacent the other end of said mandrel,
a like plurality of pins respectively disposed for radial slidable movement within the aforesaid apertures of said mandrel,
a radial groove located in the external periphery of said mandrel midway between said longitudinally disposed apertures,
a plurality of keeper wires respectively located in said longitudinal grooves and connected between longitudinal pairs of said pins,
a spring clamp mounted in the external peripheral radial groove of said mandrel in abutment with said keeper wires in such manner as to urge said keeper wires toward the axis of revolution of said mandrel for effectively urging the aforesaid pins toward a recessed position,
a shaft rotatably mounted within said mandrel having a hexagonal portion at one end thereof,
a stud having oppositely threaded ends with one end thereof connected to the other end of shaft for rotation therewith,
a pair of ramped slides respectively mounted on the oppositely threaded ends of said stud for threaded engagement therewith and in slidable contact with the aforesaid pins for adjustably urging same in an outward radial direction in opposition with the aforesaid keeper wires,
a tool head rotatably and slidably mounted on said mandrel,
at least one tool bit attached to one end of said tool head,
a worm gear mounted on and surrounding said tool head,
key means interconnecting said worm gear and said tool head,
a worm disposed in driving engagement with said worm gear,
a housing rotatably mounted on said tool head,
an adjustment nut means connected to said tool head for relative rotational movement therebetween and in threaded engagement with the threaded portion of said mandrel for moving said tool head along a portion of the length thereof when said nut means is turned on said threaded portion, and
means interconnecting said housing and the aforesaid mandrel for the holding thereof in predetermined fixed relative positions.

References Cited by the Examiner

UNITED STATES PATENTS

| | | | |
|---|---|---|---|
| 884,966 | 4/1908 | Westbrook | 144—205 X |
| 938,058 | 10/1909 | Johnston | 144—205 X |
| 1,038,881 | 9/1912 | Halton | 144—205 X |
| 2,074,424 | 3/1937 | Peterson | 82—4 X |
| 2,181,450 | 11/1939 | Davenport | 82—4 |
| 2,227,348 | 12/1940 | Johnson | 82—4 X |
| 2,419,189 | 4/1947 | Morrissette | 82—4 |
| 3,067,651 | 12/1962 | Hogden | 82—4 X |
| 3,088,352 | 5/1963 | Tanner | 82—4 X |

WILLIAM W. DYER, JR., *Primary Examiner.*

HARRISON L. HINSON, *Examiner.*